United States Patent [19]

Fujiki et al.

[11] Patent Number: 5,761,008
[45] Date of Patent: Jun. 2, 1998

[54] MAGNETIC HEAD DEVICE HAVING AN INTERMEDIATE MEMBER FOR ADJUSTING A MAGNETIC HEAD AND METHOD OF MANUFACTURE

[75] Inventors: Mitsuhisa Fujiki, Ikoma; Takeshi Omiya, Osaka, both of Japan

[73] Assignee: Matsushita Electric Industrial Co., Ltd., Kadoma, Japan

[21] Appl. No.: 669,532

[22] PCT Filed: Nov. 14, 1995

[86] PCT No.: PCT/JP95/02319

§ 371 Date: Jul. 12, 1996

§ 102(e) Date: Jul. 12, 1996

[87] PCT Pub. No.: WO96/15527

PCT Pub. Date: May 23, 1996

[30] Foreign Application Priority Data

Nov. 14, 1994 [JP] Japan ................... 6-279134

[51] Int. Cl.$^6$ ............................ G11B 5/52
[52] U.S. Cl. ...................... 360/107; 360/109
[58] Field of Search ........................... 360/107, 109

[56] References Cited

U.S. PATENT DOCUMENTS 4,151,569  4/1979  Hathaway ................... 360/107

FOREIGN PATENT DOCUMENTS 2-252114  10/1990  Japan .

*Primary Examiner*—A. J. Heinz
*Attorney, Agent, or Firm*—Wenderoth, Lind & Ponack

[57] ABSTRACT

A magnetic head device includes a rotary drum, a plurality of intermediate members fixed on the rotary drum, and a plurality of magnetic heads fixed on the respective intermediate members. Each magnetic head is secured on the rotary drum through an associated intermediate member. A combined thickness of the magnetic head and the intermediate member is set so that variation of track heights of the magnetic heads can be offset. Therefore, it is not necessary to provide a head base or connecting parts, which results in a magnetic head device which is suitable for multiple-magnetic-head devices and small-sized magnetic-head devices. A high-precision magnetic head device can be effectively produced because the variations of track heights of the magnetic heads is offset by the thickness of the intermediate members interposed therebetween.

8 Claims, 2 Drawing Sheets

MAGNETIC HEAD DEVICE HAVING AN INTERMEDIATE MEMBER FOR ADJUSTING A MAGNETIC HEAD AND METHOD OF MANUFACTURE

FIELD OF THE INVENTION

The present invention relates to a magnetic head device used in a magnetic recording and/or reproducing device such as video tape recorder (VTR) and its manufacturing method.

BACKGROUND OF THE INVENTION

Recently a magnetic recording and/or reproducing device such as VTR has come to be digitized for providing a high-quality image and sound and an increased dubbing performance. A trend for such higher recording data rate has led to a high density image recording by, for example, narrowing recording tracks and/or increasing the number of magnetic heads. Also, an endeavor has been undertaken to minimize the size of the device while improving its recording density and using a small-sized rotary drum.

FIG. 5 is a plan view showing a rotary drum of a conventional magnetic head device, in which the rotary drum is generally indicated by reference numeral 50. In this magnetic head device, a plurality of magnetic heads 51 to 56 are joined by adhesive onto the respective head bases 57 to 60, and each head base is in turn immovably mounted by screws (not shown) onto rotary drum 50. In addition, as shown in FIG. 6 which illustrates magnetic heads 51 and 53 viewed along the arrow B, each of magnetic heads 51 to 56 includes a track at its front surface. After magnetic heads 51 to 56 have been secured onto rotary drum 50, relative heights (e.g., $H_{o1}$, $H_{o2}$) of the tracks of magnetic heads 51 to 56 from certain reference levels in head bases 51 to 56 are adjusted by deforming the head bases in a known manner such as by turning an adjustment screw (not shown). In the meantime, each of magnetic heads 51 to 56 includes a small gap or slit defined at its front portion and an azimuth angle of the gap is adjusted to a predetermined angle.

In the above-described conventional magnetic head device, however, a multi-head structure having six magnetic heads supported on the four head bases is arranged on a rotary drum. Consequently, if the rotary drum has a small diameter, the magnetic head portions including head bases take relatively a large space on the rotary drum. This results in a restriction in joining the rotary portion to a rotor and also in connecting the magnetic head with a rotary transducer. Further, because of the space problem, it is even difficult to increase the number of the magnetic heads for a higher recording data rate.

In the meantime, in spite of the fact that the magnetic devices normally include a variation of approximate 20 micron meters in track height, a recent movement for reducing the width of tracks to, for example, 20 micron meters requires the relative track height between the magnetic heads (i.e., $H_{o2}$ minus $H_{o1}$) to be controlled as strictly as possible. Specifically, for the conventional magnetic head described above in which the track height in the magnetic head can be controlled by the head base, the relative track height should be kept under about five micron meters. Contrary to this, for the magnetic head having no fine adjustment mechanism for the track height in the magnetic head for lightening its head mass, such as an auto-tracking head using a bimorph piezo-electric-member, the relative track height should be kept under about two micron meters.

Therefore, in manufacturing the magnetic head device, firstly magnetic head 51 is glued onto head base 57, secondly among a number of magnetic heads a certain magnetic head 53 having a specific relative track height for the actual track height $H_{o1}$ is selected, and finally the selected magnetic head is adhered onto head base 57. Yet, in order to prepare the two magnetic heads to be paired, a great number of magnetic heads 53 should be stocked, normally about 5 to 10 times as many as magnetic heads 51, which results in an increase in stock of the magnetic heads.

Moreover, the magnetic head is a high value-added product which needs complicated machining in its production and is required to meet a number of standards with respect to, for example, head C/N, track width, azimuth angles, and interference fringe, as well as track height, and therefore the reduction of the stock is required for an inexpensive production thereof.

SUMMARY OF THE INVENTION

It is therefore an object of the present invention to overcome the aforementioned drawbacks and to provide a magnetic head device which needs no head bases or connecting parts and is suitable for multiple-magnetic-head devices and small-sized magnetic head devices.

Another object of the invention is to provide a high precision magnetic head device inexpensively and its effective manufacturing method in which a variation of track height in a magnetic head is offset by a thickness of an intermediate member combined with the magnetic head.

To achieve the objects, a magnetic head device of the present invention has a rotary drum, a plurality of intermediate members joined onto the rotary drum, and a plurality of magnetic heads joined onto the respective intermediate members.

A magnetic head device according to another embodiment of the present invention has a rotary drum, a plurality of intermediate members joined onto the rotary drum, and a plurality of magnetic head joined onto the respective intermediate members, wherein, in each combination of the magnetic head and the associated intermediate member, a total height of a track height in the magnetic head and a height of the associated intermediate member or a relative value in the total height ranges within a predetermined value.

The intermediate member is preferably made of glass. Further, the intermediate member is suitably glued to the rotary drum by the use of an ultraviolet curable glue which hardens upon exposure to an ultraviolet light.

A manufacturing method of the magnetic head according to the present invention includes a combining step in which each magnetic head and the associated intermediate member are so combined that a total height of a track height in the magnetic head and a height of the associated intermediate member or a relative value in the total height ranges within a predetermined value, a first joining step in which each magnetic head is joined with the associated intermediate member, and a second joining step in which each intermediate member is joined onto the rotary drum while regulating a height of the magnetic head to a predetermined range.

In this manufacturing method, the combining step preferably includes a ranking step in which a number of intermediate members are ranked with respect to their thickness into a plurality of ranks, a measuring step in which the track height of each magnetic head is measured, and a selecting step in which, depending upon the height of each magnetic head, the suitable rank of intermediate member is selected. Further, in the second joining step, the intermediate member is suitably joined onto the rotary drum by the use of an ultraviolet curable resin.

According to the magnetic head device and its manufacturing process of the present invention, since the magnetic heads are joined onto the rotary drum via respective intermediate members interposed therebetween, no head base or connecting parts are needed. Therefore this permits the rotary drum to have thereon more magnetic heads, which results in a high recording-data rate and a smaller magnetic head device. Furthermore, because, in each combination of the magnetic head and the associated intermediate member, a total height of a track height in the magnetic head and a height of the associated intermediate member or a relative value in the total height ranges within a predetermined value, a variation of the height of the track can be offset. Therefore, the relative track heights of the magnetic heads can easily be adjusted on the rotary drum. Further, the number of stock of the magnetic heads will be effectively decreased. Furthermore, because the ultraviolet curable resin is used for adhering the intermediate member to the rotary drum, a high precision magnetic head device can be produced with a high yielding rate.

PREFERRED EMBODIMENT OF THE INVENTION

Figure 1:
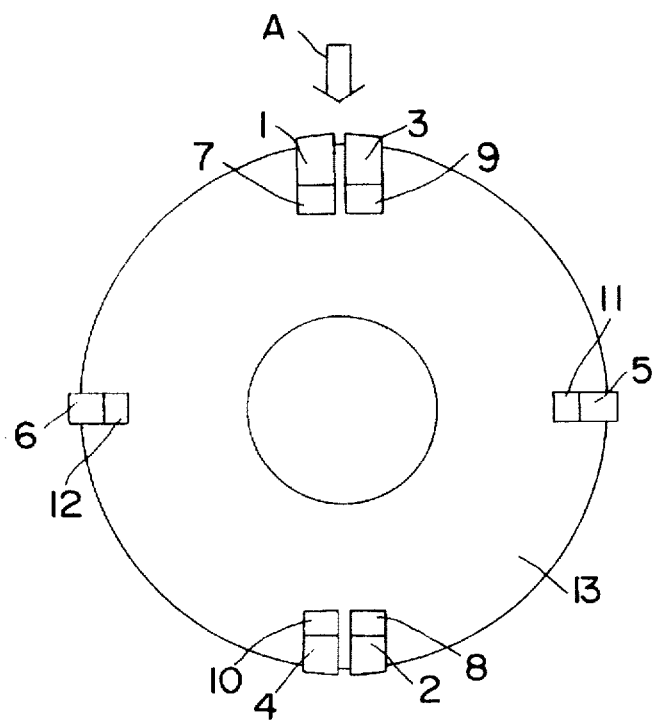
FIG. 1 is a plan view of a rotary drum of a magnetic head device of an embodiment according to the present invention.
Figure 2:
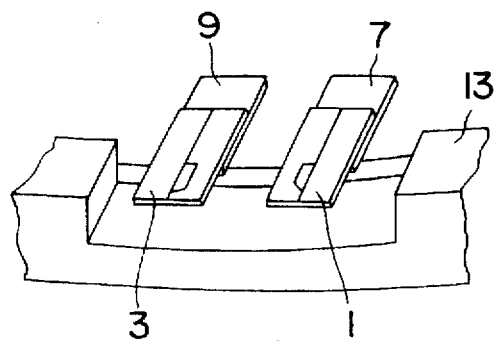
FIG. 2 is a perspective view of the magnetic head in the magnetic head device of the embodiment shown in FIG. 1 according the present invention.

With reference to the attached drawings, an embodiment of the present invention will be described below. FIG. 1 is a plan view of an embodiment of a rotary drum in a magnetic head device according to the present invention, and FIG. 2 is a partial perspective view of the magnetic head device including magnetic heads. As shown in FIG. 1, a plurality of magnetic heads indicated respectively by reference numerals 1 to 6 are joined or fixed onto a rotary drum 13 through respective intermediate members 7 to 12 so as to form a plurality of magnetic head assemblies. Arranged near intermediate members 7 to 12 is a flexible printed circuit board (not shown) to which both ends of a coil wound in each of magnetic heads 1 to 6 are connected.

Figure 3:
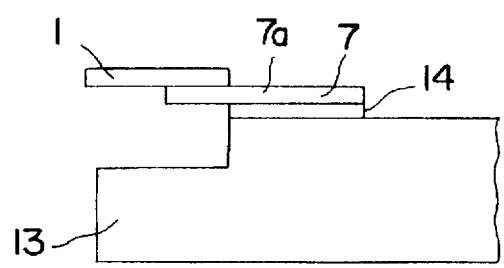
FIG. 3 is an elevational view of the magnetic device in the magnetic head device of the embodiment shown in FIG. 1 according to the present invention.

FIG. 3 is a partial side elevational view of magnetic head 1, in which magnetic head 1 is joined onto rotary drum 13 through intermediate member 7 interposed therebetween. A resin 14 is used as an adhesive means, which is capable of being hardened upon exposure to ultraviolet light. The ultraviolet curable resin 14 may also work as a fine adjustment means so that a height of a track formed in the magnetic head can be controlled by regulating a thickness of its adhesive layer. For the ultraviolet curable resin, one-component adhesive having mainly a denaturated-acrylate is preferably used.

Intermediate member 7 is preferably made of, for example, glass which permits the ultraviolet light to penetrate therethrough. In mounting, intermediate member 7 is firstly held at its upper surface 7a by a holding means such as air chuck, secondly adjusted finely as to satisfy a plurality of positional requirements of magnetic head 1, e.g., track height and its assignment, an amount of its projection from the rotary drum, a position of an interference fringe, an azimuth angle, and finally illuminated by the ultraviolet light for hardening the adhesive resin so that it is secured at a predetermined position.

Figure 4:
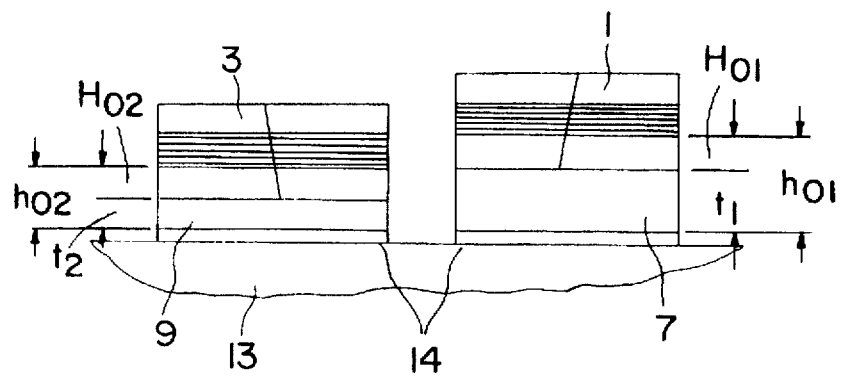
FIG. 4 is a front view of the magnetic device in the magnetic head device of the embodiment shown in FIG. 1 according to the present invention.
Figure 5:
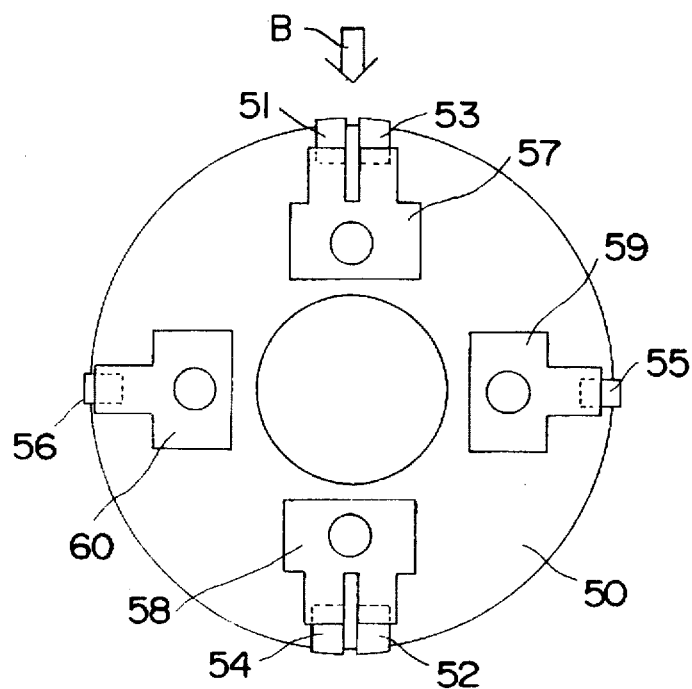
FIG. 5 is a plan view of a rotary drum in a conventional magnetic head device.
Figure 6:
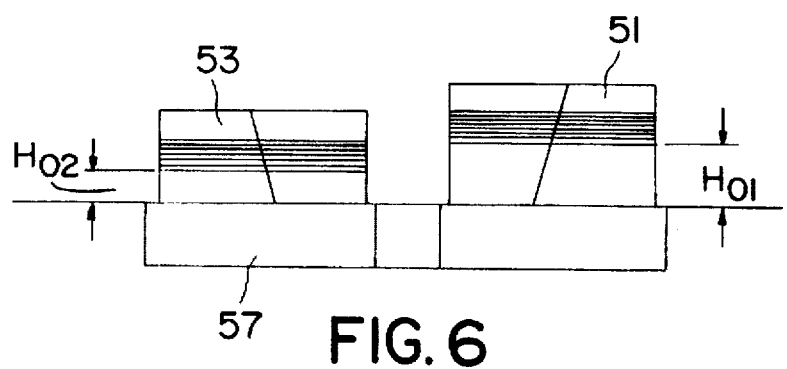
FIG. 6 is a front view of a magnetic head of the conventional magnetic head device shown in FIG. 1.

FIG. 4 shows magnetic heads 1 and 3 viewed along the arrow A in FIG. 1. As shown in FIG. 4, $H_{01}$ represents a height of the track in magnetic head 1 from the bottom surface thereof, while $h_{01}$ represents a resultant track height when intermediate member 7 having a height or thickness of $t_1$ has been glued therebelow. Further, $H_{02}$ represents a height of the track in magnetic head 3, while $h_{02}$ represents a resultant track height when the intermediate member 9 having a height or thickness of $t_2$ has been glued therebelow. Likewise, other magnetic heads 2 and 4 to 6 are joined onto the rotary drum via the intermediate members having respective suitable thicknesses, and therefore the tracks in magnetic heads 1 to 6 are arranged so as to provide them with a desired relationship of the track heights.

The intermediate member, made of glass having a rectangular shape, can be easily applied on both of its plane sides with a machining for example wrapping, which enables the thickness thereof to be finely and inexpensively finished with a variation of about two micron-meters. This allows the intermediate members to be classified and stocked depending upon their thicknesses into a plurality of ranks or classifications. Further, a variation in the magnetic head, being large comparatively, can easily be offset by the associated intermediate member which has a suitable thickness so as to provide the desired resultant track height. Specifically, firstly the track heights of the magnetic heads are measured, and secondly the suitable intermediate members are selected from among the classified intermediate members and combined with the magnetic head so that the actual resultant track heights (i.e., the sums of heights of the track and the associated intermediate members) are regulated within a predetermined range, respectively. Otherwise, the suitable intermediate members are selected and combined with the magnetic devices so as to keep the relative resultant track heights of magnetic heads to be arranged on the rotary drum within the predetermined range. Similarly, by using the magnetic head together with the selected intermediate member, no conventional operation of selecting a set of magnetic heads is needed.

As described above, the magnetic head and its manufacturing process of the present invention in which the magnetic heads are joined or fixed on the rotary drum through respective intermediate members requires no head base, and therefore permits the space over the rotary drum to be effectively used for other purposes, which results in a smaller sized magnetic head device.

Further, the resultant track height is precisely and easily set to the predetermined height using the intermediate members, each of which has a simple configuration and is finely and inexpensively machined. This also results in a reduction of the necessary stock of the magnetic heads, each of which is manufactured through complicated machining and therefore has a high added value.

Furthermore, because the intermediate member to which the magnetic head has been joined is adhered to the rotary drum through the ultraviolet curable resin and also the height of the magnetic head device is controlled by adjusting the thickness of the resin, the magnetic head has a high precision and is manufactured with a high yielding rate.

Although the intermediate member is made of glass which permits the ultraviolet light to penetrate therethrough in the previous embodiment, the magnetic head may also be made of glass or resin so that the ultraviolet light can pass, which allows the ultraviolet light to penetrate through the magnetic head and then harden the resin.

Further, although the ultraviolet curable resin is preferably used because of its instant hardening upon exposure to the ultraviolet light, other instant hardening adhesives may be used.

Furthermore, other materials, not limited to glass, may be employed for the intermediate member provided that they are capable of being precisely and inexpensively machined.

Moreover, although six magnetic heads are arranged on the rotary drum in the previous embodiment, the number of the magnetic devices on the rotary drum is not limited thereto.

The present invention is not limited to a magnetic head comprising a lower fixed drum and an upper rotary drum, it may also applied to the type employing a rotary transformer in which both the upper and lower drums are fixed.

It is obvious from the above description that, according to the magnetic device and its method of the invention, since the magnetic heads are joined onto the rotary drum via respective intermediate members interposed therebetween, no head base is needed. This permits the rotary drum to have thereon more magnetic heads, which results in a smaller size magnetic head device.

Furthermore, by offsetting a variation of the height of track in the magnetic head using the intermediate member which has a simple configuration and is easily, inexpensively, and precisely machinable, the resultant track height can easily and precisely be set to a predetermined height. This decreases the number of the stock of magnetic devices, each being produced through complicated processes and therefore having a high added value. This also enables the high precision magnetic head to be manufactured with ease and low cost, which results in an effective manufacturing of the magnetic head.

In addition, the use of ultraviolet curable resin for adhering the intermediate member to the rotary drum provides a high precision magnetic head device with a high yielding rate.

It should be noted that various modifications may be made to the above described structure without departing from the spirit and scope of the invention present. Also, all included in the above description and illustrated in the attached drawings is just for the purpose of describing the present invention, and should not be interpreted as to restrict the scope of the present invention.

We claim:

1. A magnetic head device, including:
    a rotary drum; and
    a plurality of magnetic head assemblies, each of said magnetic head assemblies comprising an intermediate member glued to said rotary drum with a curable glue which hardens upon exposure to an ultraviolet light and a magnetic head fixedly mounted on said intermediate member, said magnetic head having a track formed thereon,
    wherein said intermediate member is selected such that a combined height of said intermediate member and a height of said magnetic head track results in a total track height which is maintained within a predetermined range.

2. A method of manufacturing a magnetic head device having a plurality of magnetic heads, each of said plurality of magnetic heads has a track formed thereon, the method comprising:
    selecting, for each of said magnetic heads, an associated intermediate member such that a combined height of said track of each of said magnetic heads and said associated intermediate member is within a predetermined range;
    fixing each magnetic head on said associated intermediate member; and
    gluing each of said associated intermediate members on a rotary drum with ultraviolet curable glue, and exposing said clue to ultraviolet light.

3. The method of manufacturing a magnetic head device as claimed in claim 2, wherein said selecting step further comprises:
    classifying a number of intermediate members with respect to their thickness into a plurality of classes;
    measuring a track height of each of said magnetic heads; and
    selecting one of said plurality of classes of intermediate members for each of said magnetic heads depending upon the track height of each of said magnetic heads.

4. A magnetic head device, including:
    a rotary drum; and
    a plurality of magnetic head assemblies non-adjustably secured on said rotary drum, each of said plurality of magnetic head assemblies comprising an intermediate member glued on said rotary drum with a curable glue which hardens upon exposure to an ultraviolet light, and
    a magnetic head fixedly mounted directly on said intermediate member, said magnetic head having a track formed thereon,
    wherein said intermediate member is selected such that a combined height of said intermediate member and a height of said magnetic head track results in a total track height which is maintained within a predetermined range.

5. A magnetic head device, including:
    a rotary drum; and
    a plurality of magnetic head assemblies, each of said magnetic head assemblies comprising an intermediate member secured on said rotary drum and a magnetic head fixedly mounted on said intermediate member, said magnetic head having a track formed thereon,
    wherein said intermediate member is formed of glass and is selected such that a combined height of said intermediate member and a height of said magnetic head track results in a total track height which is maintained within a predetermined range.

6. The magnetic device as claimed in claim 5, wherein said intermediate member is glued to said rotary drum with a curable glue which hardens upon exposure to an ultraviolet light.

7. A magnetic head device, including:
    a rotary drum; and
    a plurality of magnetic head assemblies non-adjustably secured on said rotary drum, each of said plurality of magnetic head assemblies comprising an intermediate member fixedly secured on said rotary drum, and
    a magnetic head fixedly mounted directly on said intermediate member, said magnetic head having a track formed thereon, wherein said intermediate member is formed of glass and is selected such that a combined height of said intermediate member and a height of said magnetic head track results in a total track height which is maintained within a predetermined range.

8. The magnetic device as claimed in claim 7, wherein said intermediate member is glued to said rotary drum with a curable glue which hardens upon exposure to an ultraviolet light.

* * * * *